US008229031B2

United States Patent
Schmid (10) Patent No.: US 8,229,031 B2
(45) Date of Patent: Jul. 24, 2012

(54) GALILEO/GPS RECEIVER WITH IMPROVED POSITIONING ACCURACY

(75) Inventor: Andreas Schmid, Duisburg (DE)

(73) Assignee: Infineon Technologies AG, Neubiberg (DE)

( * ) Notice: Subject to any disclaimer, the term of this patent is extended or adjusted under 35 U.S.C. 154(b) by 1189 days.

(21) Appl. No.: 12/036,105

(22) Filed: Feb. 22, 2008

(65) Prior Publication Data

US 2009/0213906 A1 Aug. 27, 2009

(51) Int. Cl.
*H04L 27/00* (2006.01)
*H03K 9/00* (2006.01)

(52) U.S. Cl. ........................................ 375/316; 342/451

(58) Field of Classification Search .................. 375/147, 375/316; 342/451
See application file for complete search history.

(56) References Cited

U.S. PATENT DOCUMENTS

2006/0017615 A1* 1/2006 Schmid et al. ................. 342/451
2009/0002227 A1* 1/2009 Jia et al. .................... 342/357.06

OTHER PUBLICATIONS

Schmid, A., et al., "A Combined Galileo/GPS Receiver Architecture for Consumer Market Applications," Proceedings of European Space Agency (ESA) Satellite Navigation User Equipment Technology Workshop, Dec. 8-10, 2004, 8 pages. Eurpeoan Space Agency, The Netherlands.

Schmid, A., et al., "Combined Galileo/GPS Architecture for Enhanced Sensitivity Reception," AEU—International Journal of Electronics and Communications, Jul. 15, 2005, pp. 297-306, vol. 59, No. 5, Elsevier GmbH, Amsterdam, The Netherlands.

Schmid, A., et al., "Differential Correlation for Galileo/GPS Receivers," Proceedings of IEEE International Conference on Acoustics, Speech, and Signal Processing, Mar. 2005, pp. III-953-III-956, vol. 3, IEEE.

Schmid, A., et al., "Galileo/GPS Receiver Fixed-Point Implementation using Conventional and Differential Correlation," Institute of Navigation (ION) Global Navigation Satellite System (GNSS) 18th International Technical Meeting of the Satellite Division, Sep. 13-16, 2005, pp. 1945-1956, Fairfax, VA.

Schmid, A., et al., "Performance Evaluation of Differential Correlation for Single Shot Measurement Positioning," Institute of Navigation (ION) Global Navigation Satellite System (GNSS) 17th International Technical Meeting of the Satellite Division, Sep. 21-24, 2004, pp. 1998-2009, Fairfax, VA.

* cited by examiner

*Primary Examiner* — Chieh M. Fan
*Assistant Examiner* — Freshteh N Aghdam
(74) *Attorney, Agent, or Firm* — Slater & Matsil, L.L.P.

(57) ABSTRACT

Embodiments related to global positioning are described and depicted.

20 Claims, 6 Drawing Sheets

GALILEO/GPS RECEIVER WITH IMPROVED POSITIONING ACCURACY

TECHNICAL FIELD

An embodiment of the invention relates generally to a receiver for detection and processing of a GPS signal, and a related method.

BACKGROUND

A system in use today for determining an unknown position of a mobile radio receiver may utilize the satellite-based GPS system ("Global Positioning System"), and in the near future, the European Galileo system. The terms "GPS" and "Galileo" will be used interchangeably herein. Both systems work similarly, each employing about 24 to 30 orbiting satellites and each with accurately known position and time, which transmit a signal with a time stamp that indicates when the signal was sent from the satellite. In order to be able to compute the position of the mobile receiver, satellite clocks in each system are accurately synchronized to a common time reference. The mobile receiver calculates its position by the following (simplified) steps: First the time stamp of at least four satellites is extracted from received signals by the mobile receiver, and the time of arrival of the time-stamped message is recorded. The distance from each satellite to the mobile receiver is calculated by comparing the respective time stamp with its arrival time, using the accurately known propagation velocity of the radio signal. The position of each satellite can be accurately determined at any instant in time using satellite ephemeris data, which is regularly updated. Thus, the distance to at least three of the satellites can be calculated by the mobile receiver position using triangulation. However, the clock in the mobile receiver may not be fully synchronized with the synchronized clocks in the satellites. A time-stamped signal received from a fourth satellite by the mobile receiver is generally used to compensate clock uncertainty in the mobile receiver. To improve accuracy even further in determining the location of the mobile receiver, perturbation effects operative on the received signal such as atmospheric effects, earth rotation, relativity, etc., are typically included in the computation of the mobile receiver location.

The time stamp sent out from the satellites uses a spread-spectrum code with a bit rate of about 1 Mchip/s (1.023 Mchip/s). Since the speed of light (in a vacuum) is about 299,792,458 m/s, the "length" of one chip is about 300 m. This means that in order to obtain good accuracy in the position computation, the arrival time must be determined by the mobile receiver within a reasonably small fraction of a chip. Existing products are able to determine position with accuracy better than 10 m when there is sufficiently high signal to noise ratio, confirming that it is possible to determine the time of arrival of the received signal with high accuracy.

Satellite navigation applications require Galileo/GPS receivers with high positioning accuracy at low signal-to-noise ratio. This is particularly the case for applications in deep urban and indoor environments, where envelopes of buildings and vehicles attenuate the signals transmitted by the satellites, which are already very weak at about −160 dBW when unobstructively received on the earth's surface. Positioning accuracy produced by a Galileo/GPS receiver generally depends on the signal-to-noise ratio of the received signal, which is typically low in deep urban and indoor environments. The result is a degrading of positioning accuracy in view of user expectations or system requirements.

Thus, the design of an improved Galileo/GPS receiver that provides improved positioning accuracy, particularly in an environment of low received signal-to-noise ratio, would address an unanswered application need.

SUMMARY OF THE INVENTION

In accordance with one exemplary embodiment of the invention, a receiver to estimate its distance to a GPS satellite and a related method are provided. The receiver includes first and second baseband signal despreader stages, each despreader stage configured to produce, respectively, first and second coherently integrated baseband signals from a digitized baseband spread-spectrum signal corresponding to a first and a second estimate of received signal timing. In an embodiment, the first and second timing estimates comprise, respectively, early and late estimates of received signal timing. First and second coherent integration stages are coupled respectively to the first and second baseband signal despreader stages. The first and second coherent integration stages are each configured to delay and form a complex conjugate respectively of the coherently integrated baseband signals, and each is configured to form, respectively, a sum of products of the coherently integrated baseband signals with the delayed and complex conjugated coherently integrated baseband signals. In an embodiment, the first and second coherent integration stages are each configured to delay the coherently integrated baseband signals by a period of integration of the first and second baseband signal despreader stages. A distance estimation stage is coupled to the first and second coherent integration stages, and is configured to produce an estimate of distance of the receiver to a transmitter such as a GPS satellite from the sums of products.

In an embodiment, the first and a second baseband signal despreader stages employ a secondary despreading code.

BRIEF DESCRIPTION OF THE DRAWINGS

In the figures, identical reference symbols generally designate the same or substantially identical component parts throughout the various views. In the description below, various exemplary embodiments of the invention are described with reference to the following drawings, in which.

DETAILED DESCRIPTION OF ILLUSTRATIVE EMBODIMENTS

Long observation periods are important for positioning accuracy in an environment with low signal-to-noise ratio. However, the maximum coherent integration period for processing a received signal is limited by residual frequency deviation. The longer the coherent integration period, the smaller is the tolerable frequency deviation. Frequency deviation cannot be avoided due to unknown Doppler frequency shifts at the transmitter and receiver. A known method of signal detection and processing therefore includes noncoherent integration which allows indefinite extension of the observation period without increasing sensitivity to frequency deviation. However, noncoherent integration is substantially less effective than coherent integration for improving the effective signal-to-noise ratio of the received signal.

Figure 1:
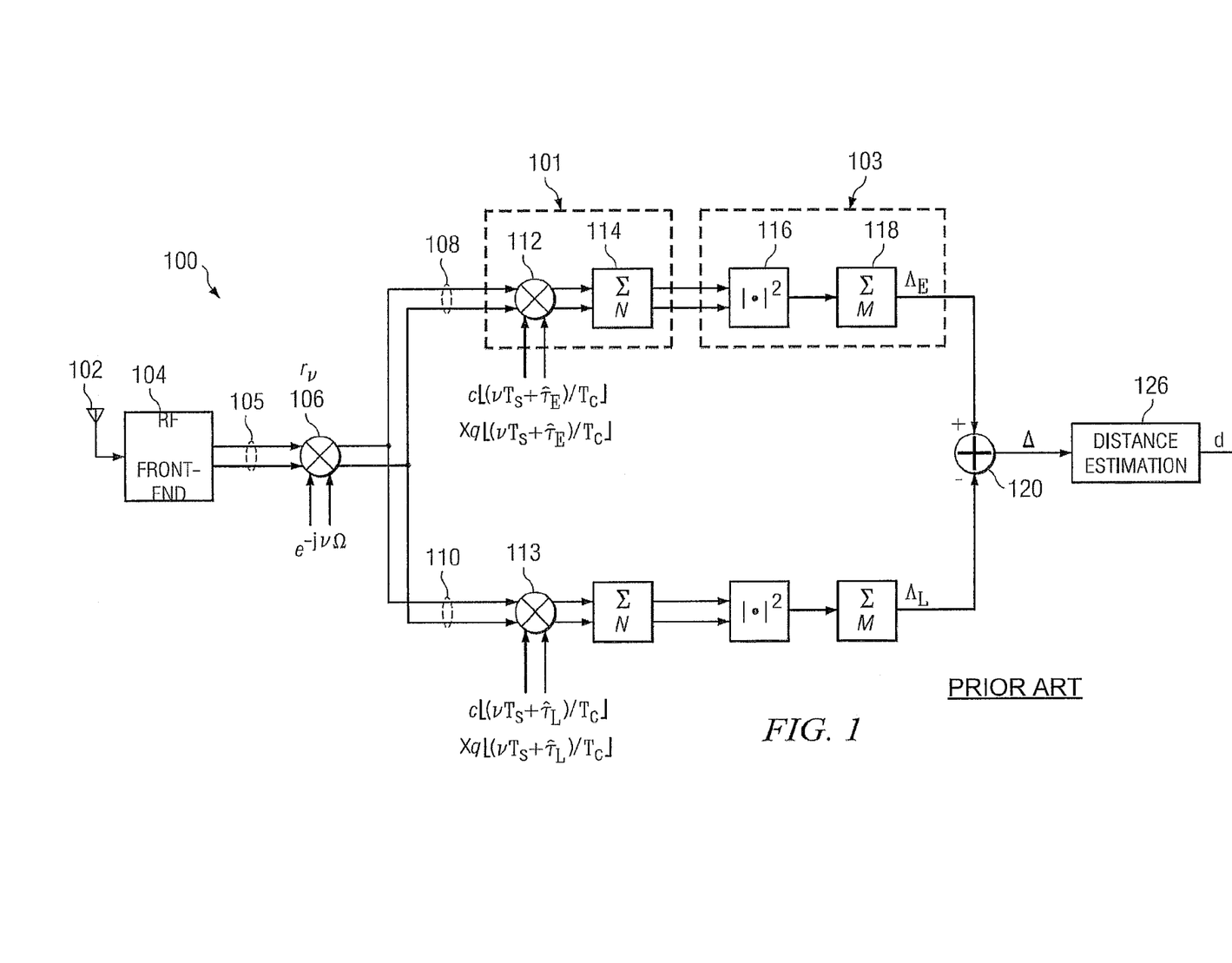
FIG. 1 illustrates an exemplary block diagram of a known GPS receiver signal-processing chain.

Signal acquisition is the first step for measuring GPS receiver position. A receiver performs a grid search for the code phase of the received signal. However, the receiver limits the resolution of estimated code phase to the pre-determined size of code phase search bins. The coarse granularity of code phase search bins generally provides insufficient accuracy for most positioning applications. Higher accuracy can be obtained by interpolating the received code phase between samples of a correlation peak. The standard approach for code phase estimation in GPS receivers is early-late discrimination. This method arises automatically when a rectangular spreading pulse form is considered. FIG. 1 illustrates a known positioning receiver chain with noncoherent integration and early-late discrimination.

Turning now to FIG. 1, illustrated is an exemplary block diagram of a known GPS receiver signal-processing chain 100 employing a commonly used sequence of coherent and noncoherent integration signal-processing steps, including early and late signal discrimination paths. Coherent integration refers to processing both the magnitude and phase of a received signal. For example, coherent integration can be performed by separately integrating signed real and imaginary components of a signal represented in the complex plane, such as by separately integrating in-phase and quadrature signal components. The received signal may be coherently integrated after conversion to baseband using a local oscillator that may have a frequency imprecisely tuned to the carrier frequency of the transmitter. For example, the local oscillator may have a frequency selected from a frequency search table that is used in the process of acquiring a received GPS signal. Noncoherent integration generally refers to processing only the magnitude of a received signal. Thus, the block diagram illustrated in FIG. 1 contains an initial coherent integration stage, such as coherent integration stage 101, followed by a noncoherent stage, such as noncoherent stage 103. The total process illustrated in FIG. 1 is generally referred to as noncoherent integration.

A satellite signal is received by antenna 102 and amplified, filtered, and converted to a complex digital signal sequence 105 by RF (radio frequency) front end 104. The complex digital signal sequence is represented by in-phase and quadrature signal components. The sequence of signal components is multiplied in multiplier 106 by a sequence of complex digital phase signals $e^{j \upsilon \Omega}$, where j represents the square root of $-1$, $\upsilon$ is an integer index associated with the sequence of the digital signals (e.g., at a sampling rate of 4 MHz or 10 MHz), and $\Omega$ is the frequency of the "local oscillator" that converts the received signal to baseband frequencies. The frequency $\Omega$ is normalized to the sampling period. The resulting received signal components are represented in the figure by the symbol $r_\upsilon$, which includes in-phase and quadrature components. In a GPS receiver, the frequency $\Omega$ of the local oscillator would be sequentially set to search values selected from a frequency search table to acquire a satellite signal. If the frequency of the local oscillator, i.e., $\Omega$, matches the carrier frequency exactly, then the carrier frequency is accurately removed from the signal sequence $r_\upsilon$. Offset between the frequency of the local oscillator and the frequency of the transmitted carrier is generally due to Doppler shift (e.g., due to known or unknown relative velocity between the satellite and the receiver) and inaccuracy in setting the frequency of the local oscillator, such as due to the step size of frequencies in the frequency search table. The frequency of the local oscillator, $\Omega$, can be adjusted in a feedback process to match the Doppler corrected carrier frequency of the satellite, using techniques well known in the art.

The baseband signal components of $r_\upsilon$ are split into two signal-processing paths, 108 and 110. The upper path corresponds to an assumed early timing estimate of code delay associated with the received signal, and the lower path corresponds to a late timing estimate. These timing estimates are made based on results of the signal acquisition process. Preferably, precaution is taken to ensure that the early and late timing estimates are on opposite sides of the correct code delay value. In each path, the signal components of $r_\upsilon$, which is a spread-spectrum signal, are multiplied, e.g., by early multiplier 112, by a despreading code $c \lfloor (\upsilon \cdot T_s + \tau_E)/T_c \rfloor$ corresponding to the satellite whose signal was received, and, similarly, by late multiplier 113. The functional symbol $\lfloor x \rfloor$ represents the function "greatest integer of x." The symbol $T_s$ represents the sampling period of the analog-to-digital converter in the RF front-end that produces the sampled data in the data stream 105, the symbol $\tau_E$ represents an early estimate of received signal timing, the symbol $\tau_L$ a late timing estimate, and the symbol $T_c$ represents the time period of one chip. Of course, it is necessary to multiply using the correct despreading code phase, which may be found experimentally.

For a particular satellite listed in an ephemeris, the despreading code is generally known beforehand. For a cold start of a receiver without a reasonably updated ephemeris, the despreading code is generally not known beforehand, and must be found by a search over a list of known possibilities, e.g., over the 30 possibilities for a Galileo satellite. When the correct despreading code and correct despreading code phase are found, the output of multipliers 112 and 113 are each substantially constant. In addition, according to the design of the system, the signal components of $r_\upsilon$ can also be multiplied by a secondary despreading code $q \lfloor (\upsilon \cdot T_s + \tau_E)/T_c \rfloor$, as required in the Galileo system. Alternatively, the function $q \lfloor (\upsilon \cdot T_s + \tau_E)/T_c \rfloor$ can just be the constant 1, as used in the current GPS system. It is an objective of the signal processing chain 100 to produce an accurate estimate of $\tau$, i.e., the phase/delay of the despreading code, which in turn yields an estimate of distance to the respective satellite. Thus, the despreading process for a GPS receiver produces an estimate of time delay, rather then demodulation of a signal to recover a data sequence, which is the normal process performed in a communication channel.

Summation of the complex signal components represented by block 114 represents coherent integration. For a substantial error in local oscillator frequency, this summation produces an insubstantial output due to the chaotic nature of the signs of the summed terms when there is a substantial frequency mismatch. The period of summation represented by the parameter N is limited by the accuracy of the local oscillator frequency as well as other factors that may contribute to a frequency offset between the satellite and the receiver, such as the granularity of the frequency search space. Even for a relatively accurate local oscillator frequency, both real and imaginary components are produced by this summation process.

In the GPS system a spreading sequence of 1023 chips is typically used, which are each sampled at least twice per chip, generally more often. This produces a value for the parameter N of 2046 or greater, perhaps as much as a few hundred thousand. In mobile cellular telephones, coherence times as long as 10 ms can be produced with a stable local oscillator.

Block 116 forms the summed square of the two complex components produced by block 114.

Block 118 represents noncoherent integration. Block 118 admits a longer period M of integration than can be performed in block 114, which by itself may not produce sufficient signal strength for signal detection for further signal processing. It is noted that doubling the coherent integration parameter N in block 114 produces a 3 dB gain in signal to noise ratio, i.e., a signal half as strong can be similarly processed by doubling N, because "white" noise with zero mean is incoherently added cycle by cycle due to the independent nature of successive noise samples. However, doubling the noncoherent integration parameter M produces only a 1.5 dB gain, because the magnitude of successive noise samples, which are now nonzero mean, are added cycle by cycle, with no opportunity for cancellation among successive samples.

The output of block 118 produces the early test statistic $\Lambda_E$, and correspondingly the lower path produces the "late" test statistic $\Lambda_L$. The difference $\Delta$ between $\Lambda_E$ and $\Lambda_L$ is computed in block 120. In block 126 the difference is converted to an estimate of satellite distance by scaling the estimate of code delay with the speed of light, as described hereinabove, including corrections for atmospheric refraction of the received signal, etc.

Figure 2:
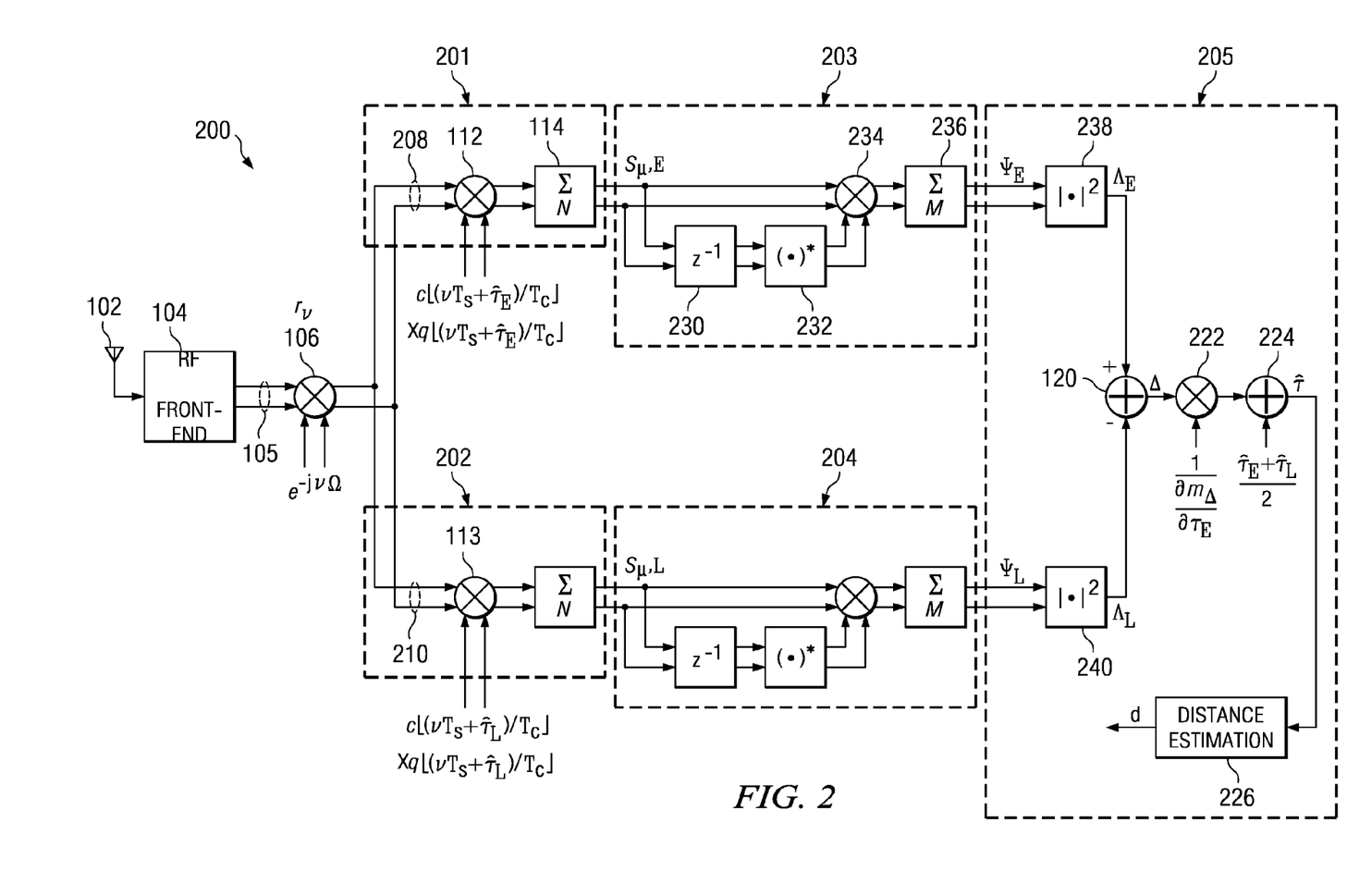
FIG. 2 illustrates a block diagram of a GPS receiver signal-processing chain employing a coherent integration signal-processing sequence, constructed according to an exemplary embodiment.

Turning now to FIG. 2, illustrated is a block diagram of a GPS receiver signal-processing chain 200 employing a coherent integration signal-processing sequence, constructed according to an exemplary embodiment. The receiver chain positioning process illustrated in FIG. 2 improves positioning accuracy over noncoherent integration, particularly for low signal-to-noise ratios that are frequently encountered in urban canyons and indoor environments. The prior-art signal processing sequence accumulates squared magnitudes of the coherent integration results. In the receiver chain illustrated in FIG. 2, the modulus operation of the prior-art code discrimination chain in FIG. 1 is replaced and now multiplies subsequent coherent integration results. The new approach can tolerate the same amount of frequency deviation as the prior-art, and can replace the signal-processing chain illustrated in FIG. 1 for a wide range of operating conditions including a position tracking operation mode. The new technique substantially improves positioning accuracy by reducing the squared noise of the prior-art method.

As illustrated in FIG. 2, the receiver signal-processing chain includes first and second baseband signal despreader stages, 201 and 202, respectively, first and second coherent integration stages, 203 and 204, respectively, and distance estimation stage 205. Multiplication is used in coherent integration stages 203 and 204 to retain coherence in place of summing a squared magnitude.

Describing broadly the signal processing stages illustrated in FIG. 2, the first and second baseband signal despreader stages are each configured to produce, respectively, summed first and second coherently integrated baseband signals. The first and second coherent integration stages are coupled respectively to the first and second baseband signal despreader stages. The first and second coherent integration stages are each configured respectively to delay and form the complex conjugate of outputs of the first and second baseband signal despreader stages, and then form respectively a sum of products of the outputs of the first and second baseband signal despreader stages with the delayed and complex conjugated outputs. The distance estimation stage is coupled to the first and second coherent integration stages, and is configured to produce an estimate of distance to the satellite from a difference derived from the sum of products, respectively, from the first and second coherent integration stages.

In the early signal-processing sequence represented generally by path 208, the signal is delayed in block 230 by one sample delay (i.e., after summing by chip samples to N), which is related to a time interval of coherence, such as 1 ms or longer, e.g., the period $N \cdot T_c$ in one embodiment. For example, if N=4092 and $T_c$=1/2046 ms, then the delay in block 230 is 4092÷(2.046 Mchip/s)≅2 ms. In block 232, its complex conjugate is formed. The signal and its delayed complex conjugate are multiplied together in block 234, and then sequentially summed as complex values in block 236 to produce the complex-valued "early" signal $\Psi_E$. Correspondingly, the complex-valued "late" signal $\Psi_L$ is produced in the lower path 210. An early test statistic $\Lambda_E$ is produced in block 238 by forming the squared magnitude of the signal $\Psi_L$. Correspondingly, a late test statistic $\Lambda_L$ is produced in the late signal-processing path 210 from the complex-valued "late" signal $\Psi_L$. The difference $\Delta$ between $\Lambda_E$ and $\Lambda_L$ is computed as before in block 120. The difference $\Delta$ is scaled by the inverse of the partial derivative of $m_\Lambda$ with respect to code delay in block 222. An offset representing the average of the early and late time offsets is added in block 224 to produce an estimate of the correct code delay $\tau$. In block 226 the estimate of code delay is converted to an estimate of satellite distance by scaling the estimate of code delay with the speed of light, with appropriate corrections as indicated previously hereinabove.

Turning now to FIG. 3, illustrated is the mean correlation peak $m_\Lambda$ and mean discrimination function $m_\Lambda$ for GPS L1-C/A and Galileo E1-B/C as calculated by the receiver chain described hereinabove with reference to FIG. 2. "L1" refers to the roughly 1.5 GHz frequency band used by GPS, and "C/A" refers to the "coarse acquisition" positioning mode originally intended for civil, i.e., nonmilitary, use of the GPS system. Exemplary early and late decision statistics, $m_{\Lambda E}$ and $m_{\Lambda L}$, are marked with a cross in FIGS. 3a and 3c. The code delay difference is denoted by $\tau$, the chip period by $T_c$, the variance of coherent integration results by $\sigma_w$, and discrimination spacing by $\delta$.

Figure 3A:
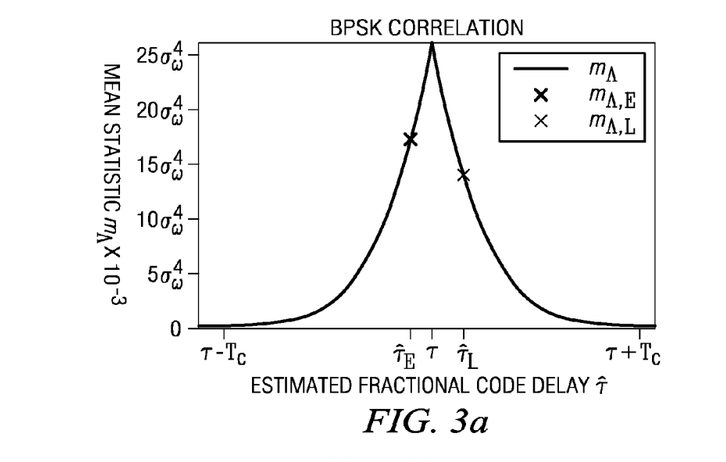
FIG. 3 illustrates the mean correlation peak and mean discrimination function for GPS L1-C/A and Galileo E1-B/C global positioning systems, as calculated by a receiver chain constructed according to an exemplary embodiment.

Illustrated in FIG. 3a is a graph showing the mean decision statistic $m_\Lambda$ as a function of code delay difference $\tau$ for binary phase-shift keying (BPSK). A sharp correlation peak versus code delay difference with respect to the despreading code is illustrated in the graph, indicating a high correlation value when the estimate of code delay difference is correct. An accuracy of a fraction of the period of a chip is required for accurate positioning. Two exemplary values of early and late data samples are illustrated in the graph. Ideally, one data point falls on the left side of the peak and one on the right side. Thus, one point is early and one point is late with respect to actual code delay difference. The code delay difference which produces the peak value is estimated from the shape of this curve.

Figure 3B:
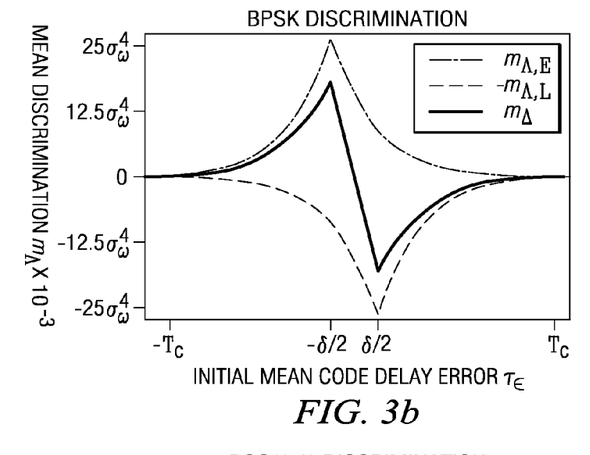

Illustrated in FIG. 3b is a graph showing components of mA separately for the early and late signal-processing paths in the upper and lower portions of the figure as a dot-dash line and as a dash line, respectively, and their difference as the solid line in the middle. The dot-dash line and the dash line in FIG. 3b correspond to the shape of the curve illustrated in FIG. 3a. Thus, if the magnitudes of the two exemplary sample points illustrated in FIG. 3a were equal, then the correct code delay would lie halfway between them. If the difference is positive, then the left code value is closer to the correct value of code delay, etc. For differences in magnitude that are close, an estimate of the correct code delay can be made by interpolation.

Figure 3C:
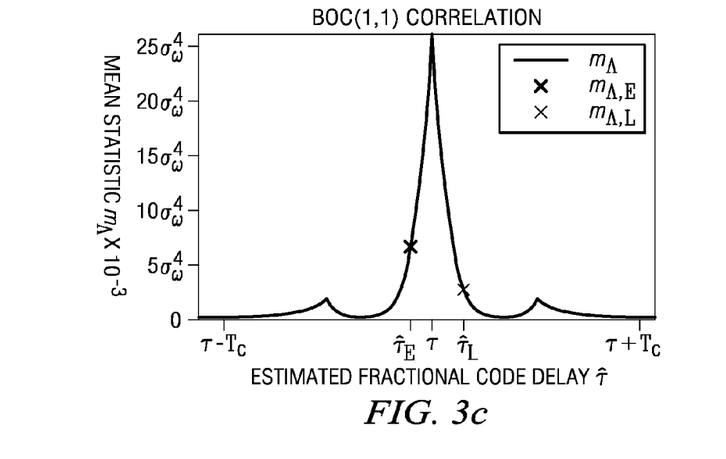
Figure 3D:
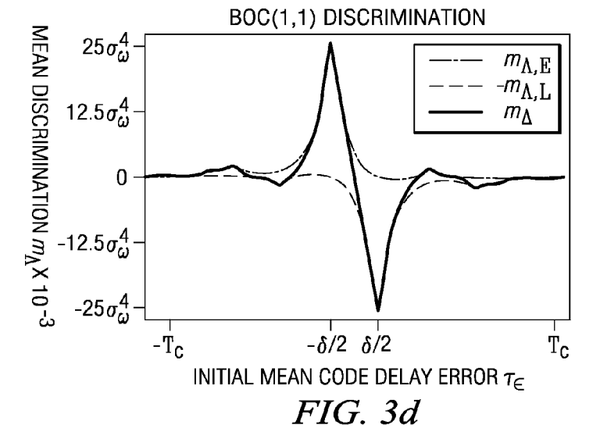
Figure 4A:
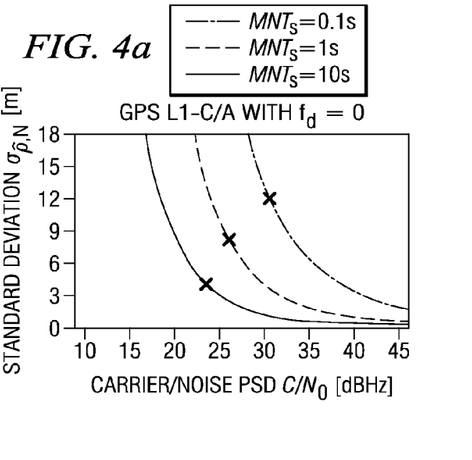
FIG. 4 illustrates graphs of the standard deviation of calculated range between a satellite and a receiver vs. carrier-to-noise power spectral density, for a known GPS receiver signal-processing chain.
Figure 4B:
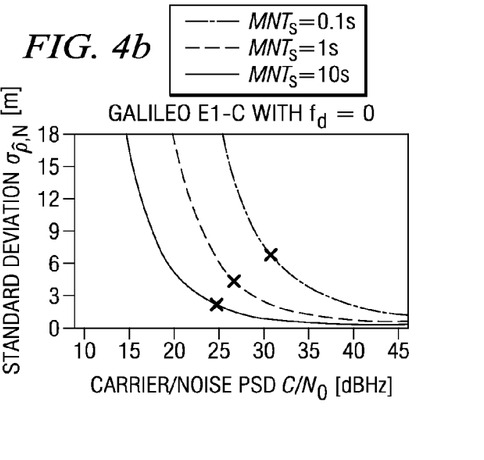
Figure 4C:
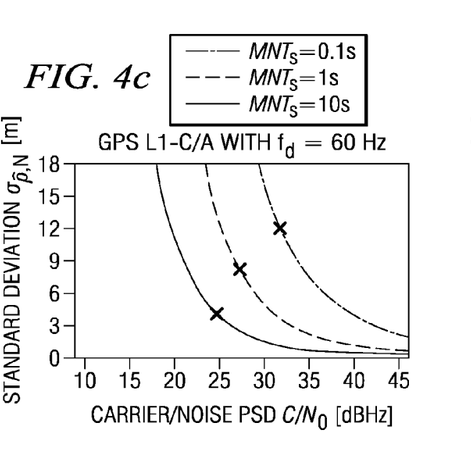
Figure 4D:
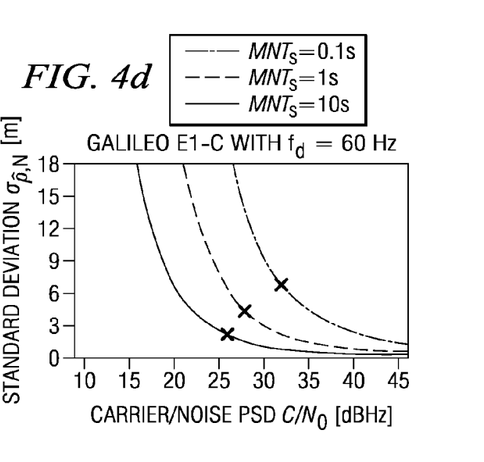
Figure 4E:
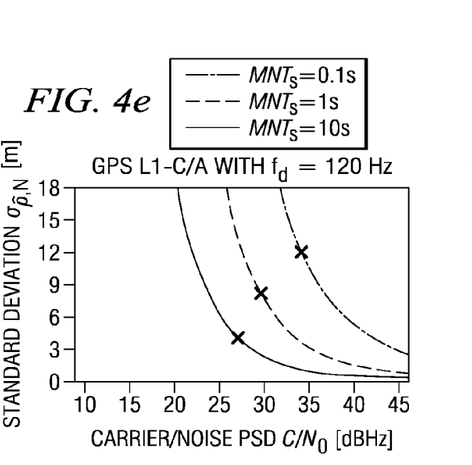
Figure 4F:
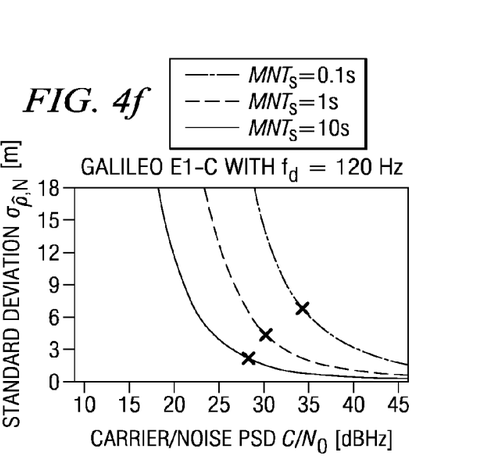
Figure 5A:
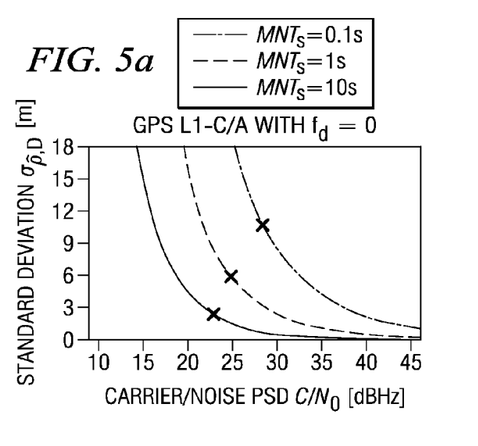
FIG. 5 illustrates the standard deviation of estimated satellite-to-receiver range for a GPS receiver signal-processing chain employing a coherent integration signal-processing sequence, constructed according to an exemplary embodiment.
Figure 5B:
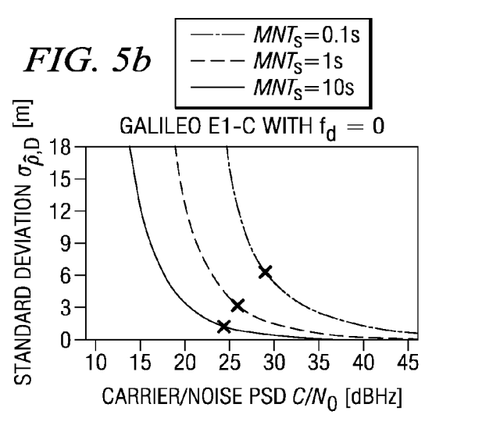
Figure 5C:
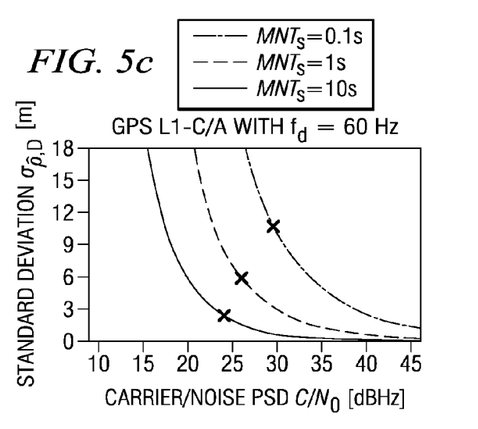
Figure 5D:
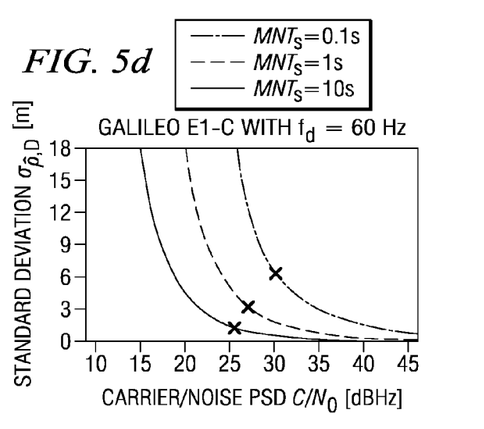
Figure 5E:
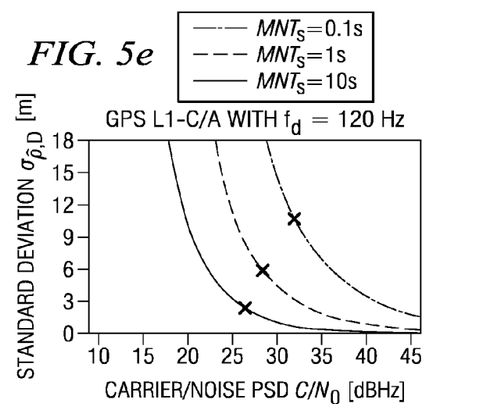
Figure 5F:
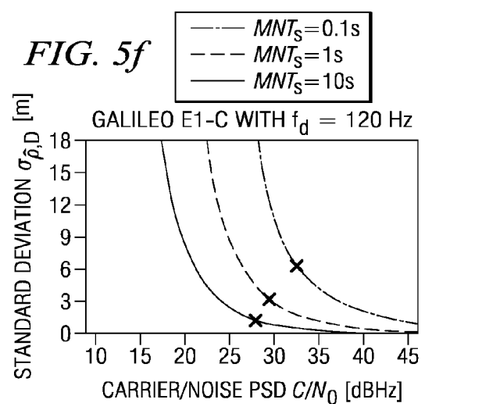
Figure 6A:
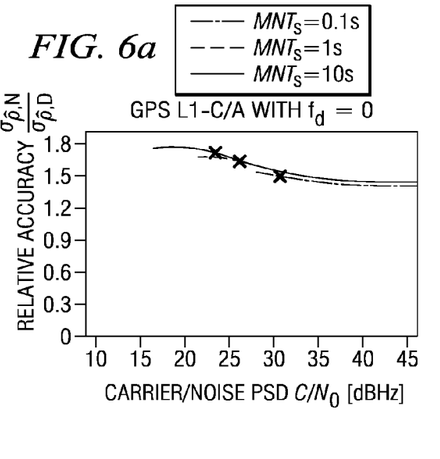
FIG. 6 illustrates ratios of standard deviation of estimated range for prior-art GPS receiver signal-processing chain to that calculated by a receiver chain constructed according to an exemplary embodiment.
Figure 6B:
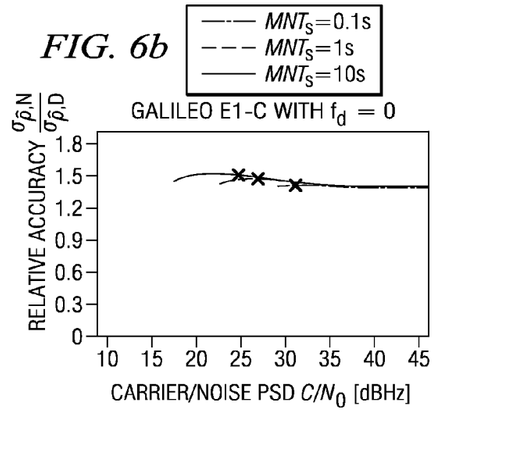
Figure 6C:
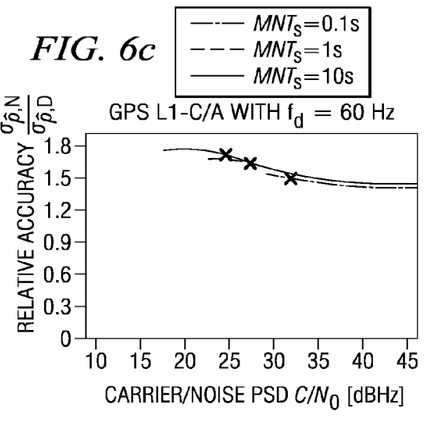
Figure 6D:
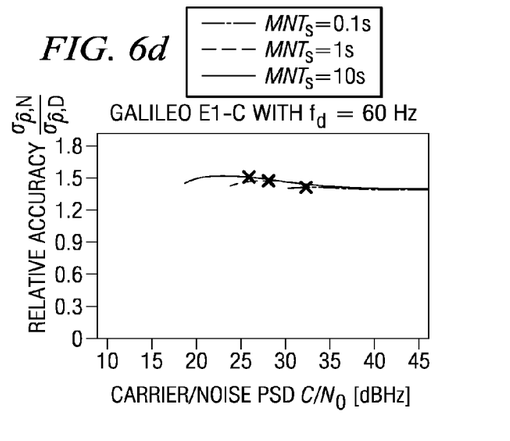
Figure 6E:
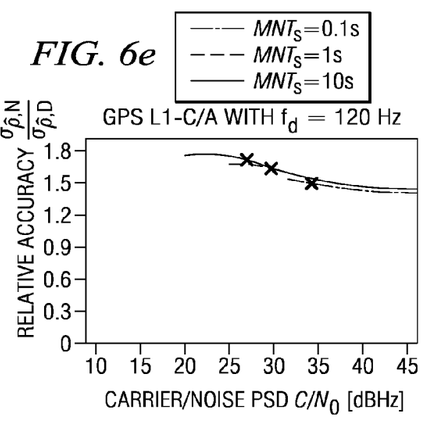
Figure 6F:
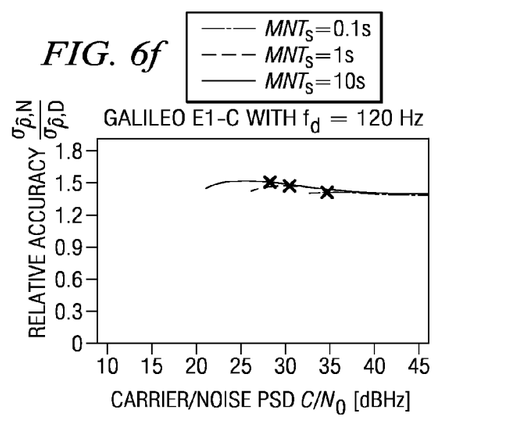

Illustrated in FIGS. 3c and 3d are graphs for binary offset carrier modulation (BOC (1,1)) corresponding to those in FIGS. 3a and 3b. BPSK modulation generally employs a square waveform with a positive value to represent to a binary bit 1, and an equivalent negative value to represent to a binary bit 0. BOC(1,1) modulation generally employs "Manchester coding" wherein a square waveform is again employed. However, for half of the time interval the modulating square waveform has a positive value to represent a binary bit 1, and during the other half of the time interval, a corresponding negative value. To represent a binary bit 0, the sign of the waveform is inverted. The net result is an average value of zero for the modulating waveform to represent either a binary bit 1 or 0. Manchester coding is used for some signals of the Galileo satellite navigation system so that the modulated waveform has no dc offset. The notation (1,1) in BOC (1,1) refers to one positive and one negative step in the modulating waveform.

Turning now to FIG. 4, illustrated, in each of the six graphs $4a, \ldots, 4f$ for the case of the prior-art positioning technique described with reference to FIG. 1, is standard deviation $\sigma_{\rho,N}$ of calculated range between the satellite and receiver (in meters) on the vertical axes, and carrier-to-noise power spectral density PSD $C/N_0$ (in dBHz) on the horizontal axes. The notation "E1-C" in the figure refers to the signal C of the Galileo E1 band, i.e., the pilot component of the Galileo open service signal in the E1/L1-band. Each plot contains three curves, which are parameterized by the total observation period $M \cdot N \cdot T_s$. Recall that $T_s$ is the sampling period of the analog-to-digital converter in the RF front end, and the product $N \cdot T_s$ is the coherent integration period. The product $M \cdot N \cdot T_s$ represents the combined observation period. The parameter $f_d$ represents the difference between the received carrier frequency and the local oscillator frequency during downconversion, such as due to uncompensated Doppler shift, the granularity of frequency bins, etc. The coherent integration period $N \cdot T_s = 4$ ms was chosen for all simulations. FIGS. 4a, 4c, and 4e show range accuracy for GPS L1-C/A with various frequency deviations $f_d$, while FIGS. 4b, 4d and 4f show corresponding range accuracies for Galileo E1-C. It can be observed in FIG. 4, that an increasing frequency deviation degrades positioning accuracy. It can also be observed that range accuracy degrades for decreasing $C/N_0$.

Turning now to FIG. 5, illustrated is the standard deviation of estimated satellite-to-receiver range $\sigma_{\rho,D}$ for the case of the new positioning technique, described with reference to FIG. 2. FIG. 5 shows a similar progression of accuracy for the new process as for the prior-art process illustrated in FIG. 4. However, the values of the standard deviation in FIG. 5 are lower than corresponding values in FIG. 4. The new method hence improves positioning accuracy. It can be observed further in FIG. 5 that the new technique improves positioning accuracy regardless of oscillator frequency deviation $f_d$. Just as in the incoherent prior-art process, the new technique allows for indefinite observation periods and can hence fully replace a prior-art signal detection and processing arrangement for a wide range of receiver configurations.

The accuracy improvement obtained by applying the new technique is summarized in FIG. 6, which illustrates ratios of estimated range standard deviations for the prior-art $\sigma_{\rho,N}$ and the new technique $\sigma_{\rho,D}$. This is the ratio of the values illustrated in FIGS. 4 and 5, and provides an indication of range accuracy improvement. It can be observed that the accuracy improvement is particularly high for low carrier-to-noise values $C/N_0$, which are frequently encountered in urban canyons and indoor environments. The accuracy improvement is independent of the frequency deviation $f_d$, which shows that the new technique provides an improvement over a prior-art receiver independent of local oscillator frequency deviation. Accuracy improvement is maintained for all simulated receiver configurations and reception conditions, and can be as great as 80%.

A GPS receiver including a signal processing chain has thus been described that may be used to advantageously construct an accurate estimate of receiver position in a low signal-to-noise ratio environment. In an embodiment, the GPS receiver includes first and second baseband signal despreader stages, each configured to produce, respectively, first and second coherently integrated baseband signals from a digitized baseband spread-spectrum signal. The first and second coherently integrated baseband signals correspond, respectively, to first and second timing estimates. In an embodiment, a first and a second coherent integration stage is coupled respectively to the first and second baseband signal despreader stages. In an embodiment, the first and second coherent integration stages are configured to delay and form a complex conjugate respectively of the coherently integrated baseband signals, and to form, respectively, a sum of products of the coherently integrated baseband signals with the delayed and complex conjugated coherently integrated baseband signals. In an embodiment, a distance estimation stage is coupled to the first and second coherent integration stages. The distance estimation stage is configured to produce an estimate of distance of the receiver to a transmitter such as a satellite from the sums of products. In an embodiment, the first and second timing estimates provide respectively, early and late estimates of received signal timing. In a further embodiment, the first and a second baseband signal despreader stages employ a secondary despreading code. In an embodiment, the delayed and complex conjugated coherently integrated baseband signals are delayed by a period of integration of the first and second baseband signal despreader stages. In an embodiment, the distance estimation stage is configured to form a magnitude, respectively, of each of the sums of products. In an embodiment, the distance estimation stage is configured to form a difference of the magnitudes. In an embodiment, the distance estimation stage scales the difference with a factor related to the speed of light to produce a distance estimate. In an embodiment, the distance estimation stage further includes a radio frequency front end configured to produce the digitized baseband spread-spectrum signal from a received signal by digitizing the received signal and multiplying the digitized baseband spread-spectrum signal by a complex digital signal. In an embodiment, the complex digital signal represents the frequency of a local oscillator. In a further embodiment, the digitized baseband spread-spectrum signal includes in-phase and quadrature signal components.

Another exemplary embodiment provides a method of constructing a receiver that can advantageously produce an accurate estimate of receiver position from a GPS satellite signal received with a low signal-to-noise ratio. In accordance with an embodiment, the method includes correlating a digitized baseband spread-spectrum signal using a despreading multiplier with a first and a second timing estimate to produce, respectively, first and second coherently integrated baseband signals. In an embodiment, the method includes delaying, respectively, the first and second coherently integrated baseband signals, and forming a complex conjugate, respectively, of the delayed first and second coherently integrated baseband signals. The method further includes forming a sum of products of the first and second coherently integrated baseband signals, respectively, with the respective complex conjugate. In an embodiment, the method further includes estimating distance of the receiver to a transmitter from the sums of products. In an embodiment, the first and second timing estimates are early and late estimates of received signal timing. In a further embodiment, demodulating the digitized baseband spread-spectrum signals includes employing a secondary despreading code. In an embodiment, the method includes demodulating the digitized baseband spread-spectrum signals with a period of integration, and delaying the first and second coherently integrated baseband signals by the period of integration. In an embodiment, the method includes estimating the distance by forming a magnitude, respectively, of each the sum of products. In an embodiment, the method includes scaling and offsetting a difference of the magnitudes to estimate the distance. In an embodiment, scaling the difference includes applying a factor related to the speed of light. In an embodiment, the method further includes digitizing a received signal and multiplying it by a complex digital signal representing a local oscillator to produce the digitized baseband spread-spectrum signal. In an embodiment, the method further includes using in-phase and quadrature components to form the digitized baseband spread-spectrum signal.

Another exemplary embodiment provides a global position system including a receiver. The receiver includes a first and a second baseband signal despreader stage, each baseband signal despreader stage configured to produce, respectively, first and second coherently integrated baseband signals from a digitized baseband spread-spectrum signal corresponding to a first and a second timing estimate. The receiver further includes first and second coherent integration stages coupled respectively to the first and second baseband signal despreader stages, the first and second coherent integration stages each configured to delay and form a complex conjugate respectively of the coherently integrated baseband signals, and each configured to form respectively a sum of products of the coherently integrated baseband signals with the delayed and complex conjugated coherently integrated baseband signals. The receiver further includes a distance estimation stage coupled to the first and second coherent integration stages, the distance estimation stage configured to produce an estimate of distance of the receiver to a transmitter from the sums of products.

Although a sequence of signal-processing stages has been described for application to estimating position of a GPS and Galileo receiver, it should be understood that other applications of these signal-processing stages are contemplated within the broad scope of the invention, and need not be limited to estimating position of a GPS and Galileo receiver.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A receiver, comprising:
   a first and a second baseband signal despreader stage, each said baseband signal despreader stage configured to produce, respectively, first and second coherently integrated baseband signals from a digitized baseband spread-spectrum signal corresponding to a first and a second timing estimate;
   a first and a second coherent integration stage coupled respectively to said first and second baseband signal despreader stages, said first and second coherent integration stages each configured to delay and form a complex conjugate respectively of said coherently integrated baseband signals, and each configured to form respectively a sum of products of said coherently integrated baseband signals with said delayed and complex conjugated coherently integrated baseband signals; and
   a distance estimation stage coupled to said first and second coherent integration stages, said distance estimation stage configured to produce an estimate of distance of said receiver to a transmitter from said sums of products.

2. The receiver as claimed in claim 1, wherein said first and second timing estimates comprise, respectively, early and late estimates of received signal timing.

3. The receiver as claimed in claim 1, wherein said first and a second baseband signal despreader stages employ a secondary despreading code.

4. The receiver as claimed in claim 1, wherein said delayed and complex conjugated coherently integrated baseband signals are delayed by a period of integration of said first and second baseband signal despreader stages.

5. The receiver as claimed in claim 1, wherein said distance estimation stage is configured to form a magnitude, respectively, of each of said sums of products.

6. The receiver as claimed in claim 5, wherein said distance estimation stage is configured to form a difference of said magnitudes.

7. The receiver as claimed in claim 6, wherein said distance estimation stage scales said difference with a factor related to the speed of light.

8. The receiver as claimed in claim 1, further including a radio frequency front end configured to produce said digitized baseband spread-spectrum signal from a received signal by digitizing said received signal and multiplying said digitized baseband spread-spectrum signal by a complex digital signal.

9. The receiver as claimed in claim 8, wherein said complex digital signal is configured to represent the frequency of a local oscillator.

10. The receiver as claimed in claim 8, wherein said digitized baseband spread-spectrum signal includes in-phase and quadrature signal components.

11. A method of operating a receiver, the method comprising:
    correlating a digitized baseband spread-spectrum signal using a despreading multiplier with a first and a second timing estimate to produce, respectively, first and second coherently integrated baseband signals;
    delaying, respectively, said first and second coherently integrated baseband signals;
    forming a complex conjugate, respectively, of said delayed first and second coherently integrated baseband signals;
    forming a sum of products of said first and second coherently integrated baseband signals, respectively, with said respective complex conjugate; and
    estimating distance of said receiver to a transmitter from said sums of products.

12. The method as claimed in claim 11, wherein said first and second timing estimates are early and late estimates of received signal timing.

13. The method as claimed in claim 11, wherein demodulating said digitized baseband spread-spectrum signals comprises employing a secondary despreading code.

14. The method as claimed in claim 11, wherein said digitized baseband spread-spectrum signals are integrated with a period of integration, and said first and second coherently integrated baseband signals are delayed by said period of integration.

15. The method as claimed in claim 11, wherein estimating said distance comprises forming a magnitude, respectively, of each said sum of products.

16. The method as claimed in claim 15, including scaling and offsetting a difference of said magnitudes to estimate said distance.

17. The method as claimed in claim 16, wherein said scaling comprises scaling with a factor related to the speed of light.

18. The method as claimed in claim 11, further including digitizing a received signal and multiplying said digitized received signal by a complex digital signal representing a local oscillator to produce said digitized baseband spread-spectrum signal.

19. The method as claimed in claim 11, further including forming said digitized baseband spread-spectrum signal with in-phase and quadrature components.

20. A global position system comprising:
a receiver, comprising:
a first and a second baseband signal despreader stage, each said baseband signal despreader stage configured to produce, respectively, first and second coherently integrated baseband signals from a digitized baseband spread-spectrum signal corresponding to a first and a second timing estimate;
a first and a second coherent integration stage coupled respectively to said first and second baseband signal despreader stages, said first and second coherent integration stages each configured to delay and form a complex conjugate respectively of said coherently integrated baseband signals, and each configured to form respectively a sum of products of said coherently integrated baseband signals with said delayed and complex conjugated coherently integrated baseband signals; and
a distance estimation stage coupled to said first and second coherent integration stages, said distance estimation stage configured to produce an estimate of distance of said receiver to a transmitter from said sums of products.

* * * * *